United States Patent [19]

Olsen et al.

[11] Patent Number: 4,814,711

[45] Date of Patent: * Mar. 21, 1989

[54] SURVEY SYSTEM AND METHOD FOR REAL TIME COLLECTION AND PROCESSING OF GEOPHYSICALS DATA USING SIGNALS FROM A GLOBAL POSITIONING SATELLITE NETWORK

[75] Inventors: Steven L. Olsen; William R. Petrick; John A. Stodt, all of Salt Lake City, Utah

[73] Assignee: Deseret Research, Inc., Salt Lake City, Utah

[ * ] Notice: The portion of the term of this patent subsequent to Aug. 11, 2004 has been disclaimed.

[21] Appl. No.: 50,953

[22] Filed: May 15, 1987

Related U.S. Application Data

[63] Continuation-in-part of Ser. No. 597,251, Apr. 5, 1984, Pat. No. 4,686,474.

[51] Int. Cl.$^4$ .......................... G01V 3/08; G01V 3/16; H04N 7/18; H04B 13/00
[52] U.S. Cl. .................................. 324/331; 358/109; 364/449; 342/357
[58] Field of Search ...................... 324/326, 330, 331; 364/424, 443, 444, 449; 367/19; 358/109; 342/357

[56] References Cited

U.S. PATENT DOCUMENTS

| | | |
|---|---|---|
| 2,610,226 | 9/1952 | Klaasse et al. . |
| 2,891,108 | 6/1959 | Wiens . |
| 2,931,857 | 4/1960 | Hammond et al. . |
| 3,005,044 | 10/1961 | Golay . |
| 3,668,308 | 6/1972 | Burt et al. . |
| 3,709,607 | 1/1973 | McConnell et al. . |
| 3,752,914 | 8/1973 | England et al. . |
| 3,864,513 | 2/1975 | Halagian et al. . |
| 3,875,497 | 4/1975 | Madsen . |
| 3,886,306 | 5/1975 | Fayard et al. . |
| 4,217,607 | 8/1980 | Cohen . |
| 4,234,241 | 11/1980 | Schmidt . |
| 4,364,085 | 12/1982 | Dalke . |
| 4,398,195 | 8/1983 | Dano . |
| 4,561,073 | 12/1985 | Brands-Aeter et al. . |

FOREIGN PATENT DOCUMENTS

| | | |
|---|---|---|
| 0123562 | 10/1984 | European Pat. Off. . |
| 959809 | 4/1950 | France . |
| 2055467 | 3/1981 | United Kingdom . |

OTHER PUBLICATIONS

Sequin, M. K., "Airborne Electromagnetic Surveys: Their Contribution to the Discovery of the Natural Riches of the Earth" (1975).

(List continued on next page.)

Primary Examiner—Reinhard J. Eisenzopf
Assistant Examiner—Walter E. Snow
Attorney, Agent, or Firm—Workman, Nydegger & Jensen

[57] ABSTRACT

A real time geophysical survey system and method. The system comprises a base station, one or more data acquisition vehicles, and a global positioning satellite network. The base station is provided with a computer, radio communication equipment, and means for determining from signals of the satellite network the position of the base station. The data acquisition vehicles are each provided with geophysical survey instrumentation, radio communication equipment, an acquisition vehicle positioning display, and means using signals of the satellite network to calculate at least an approximate horizontal position of the data acquisition vehicle. During a survey, by periodically polling each data acquisition vehicle, the base station determines the location of each data acquistion vehicle and accurately tracks its position, both with respect to the base station and with respect to a preselected survey pattern over the geographic area to be surveyed. The base station transmits signals to each data acquisition vehicle positioning display so as to guide the data acquisition vehicle along the preselected survey pattern. As the survey progresses, data representing geophysical measurements taken by the geophysical survey instrumentation on each data acquisition vehicle is periodically provided in synchronization with data about the position of each data acquisition vehicle to the base station computer. The geophysical data is then correlated in real time with the position of each data acquisition vehicle and displayed for evaluation at the base station.

25 Claims, 3 Drawing Sheets

OTHER PUBLICATIONS

L. W. Morley, "The Geophysics Division of the Geological Survey of Canada", Bulletin of the Canadian Mining and Metallurgical Institute, pp. 358–364 (1963).
W. T. C. Sowerbutts and R. W. I. Mason, "A Microcomputer Based System for Small-Scale Geophysical Surveys", Geophysics, vol. 49, No. 2, pp. 189–193 (Feb. 1984).
Yakos et al, "Time Dissemination Using Navstar Global Positioning System (GPS) Phase IIB User Equipment", Proc. 35th Ann. Freq. Control Symposium, USA ERAD Com, Ft. Monmouth, NJ, May 1981, pp. 537–544.

SURVEY SYSTEM AND METHOD FOR REAL TIME COLLECTION AND PROCESSING OF GEOPHYSICALS DATA USING SIGNALS FROM A GLOBAL POSITIONING SATELLITE NETWORK

RELATED APPLICATIONS

This is a continuation-in-part application of earlier filed pending U.S. patent application Ser. No. 597,251, filed Apr. 5, 1984 now U.S. Pat. No. 4,686,474.

BACKGROUND

1. The Field of the Invention

This invention relates to systems and methods for geophysical exploration and, more particularly to a novel system and method for conducting geophysical exploration using a real time data collection and processing survey system and signals from a global positioning satellite network.

2. The Prior Art

Each year, billions of dollars are spent on various types of geophysical surveys. The majority of these surveys are presently conducted by oil companies in search of petroleum and related fuels. In addition, however, many geophysical surveys are conducted each year which relate to mineral, geothermal, and ground water exploration as well as oceanography, engineering, and geophysical research in general. As a result, during recent years, the geophysical exploration industry has grown steadily, and this growth pattern is expected to continue for several years to come.

One of the most widely used geophysical survey techniques is seismic surveying, which may be conducted either on land or at sea. Some recent studies indicate that expenses relating to seismic surveying have accounted for approximately 75% of all expenditures for geophysical exploration during recent years.

Despite the frequent use of seismic surveying, however, it has a number of significant drawbacks which reduce both its effectiveness and its desirability in geophysical exploration. First, seismic survey techniques are extremely costly. For example, a single line mile of surveying on land using seismic survey techniques may cost several thousand dollars. While marine seismic surveys may be somewhat less expensive, marine surveys may also cost over $1,000 per line mile. In addition to the high cost of seismic surveys, seismic surveys are known to be less effective in defining subsurface structure and lithology in many frontier areas in which geophysical exploration may be desirable. For example, regions in the Pacific Northwest covered by basalt and other volcanic formations and the Intermountain Overthrust Belt are very difficult to effectively explore using seismic techniques.

In addition to the problems noted above, the drilling costs which are required in order to confirm a geophysical find have steadily increased. Moreover, geophysical exploration has surged, and competition in the geophysical exploration industry is increasing rapidly. As a result of these several factors, many attempts have been and are currently being made to develop other systems and methods for geophysical exploration. At the present time, one of the most promising of such methods appears to be that of airborne geophysical surveying, the use of which has risen steadily over the past several years. In particular, due to the significant refinements in aeromagnetic instruments, aeromagnetic surveys appear quite promising as an alternate geophysical exploration technique.

Aeromagnetic surveys are based upon the measurement of the earth's magnetic field over a particular region. It is generally known that the earth has a variable, magnetic field which is influenced by the presence of subsurface igneous and metamorphic rocks and sediments which contain magnetic particles, such as, for example, mixed oxides of iron and titanium and other magnetic ore bodies. The magnitude of the influence of such subsurface structures on the natural magnetic field in a given area is referred to as a magnetic anomaly, and such an anomaly can be measured quite precisely using an instrument called a magnetometer.

Advances in the design and sensitivity of magnetometers led to the first practical airborne use of the instrument in 1944. Since that time, further advances in instrumentation and data interpretation have led to broader application and sharply increasing use of aeromagnetic techniques for petroleum, mineral and geothermal exploration. Using such techniques, anomalous high or low values of magnetic field strength are of particular interest and are plotted as contours on appropriate maps. Properly processed and interpreted data can then be used to target the possible location and size of potential ore bodies, geothermal reservoirs, hydrocarbon traps or cultural artifacts. Thereafter, suspected finds are confirmed by the use of ground survey techniques and drilling.

Aeromagnetic surveys are presently conducted using a suitable aircraft which is equipped with a magnetometer, recording equipment, a sensitive altimeter, and a camera. The aircraft is manned by a flight crew which may consist of from one to three individuals, depending upon the particular requirements of the survey. For example, if the survey is being flown at a quite high altitude above ground level, the pilot may perform the aeromagnetic survey alone. However, when higher resolution aeromagnetics are desired, thus requiring the survey to be flown closer to the ground, the pilot is typically very busy flying and a separate navigator is usually required. In some cases, it may also be desirable to have a separate geophysical technician on board the aircraft during the survey.

Before an aeromagnetic survey is conducted, the survey is first planned by the contractor. After it is determined where the survey is to be conducted, the elevation at which the data is to be collected, and the spacing of the flight lines, the contractor maps out the survey by drawing the selected flight lines on aerial photographs of the survey area or by drawing such flight lines on topographical maps of the survey area.

Once the survey is thus planned, the flight crew is mobilized to the survey area and the survey is commenced. By following the flight lines which were previously drawn on the aerial photographs or topographical maps of the survey area, the navigator directs the pilot along the appropriate flight lines across the survey area. During the flight, the mangetometer is measuring the magnetic field, and such meansurement is being recorded by the recording equipment. At the same time, the camera takes photographs of the ground over which the plane is flying.

After the survey has been conducted and the data recorded, the flight crew returns to its base. The data can then begin to be analyzed and interpreted. In interpreting the data, a flight line positioner first views the film frame by frame and matches the photos taken by the camera on the aircraft with a large aerial photograph of the survey area. In this way, the flight line positioner determines the plane's actual position during each flight segment of the survey. Then, once the actual flight lines have been determined by the flight line positioner, the data which was recorded during the flight are corrected for diurnal changes in the earth's magnetic field and are plotted at the appropriate points along the flight lines. Finally, the data are properly contoured and are thereafter ready to be analyzed.

It will be readily appreciated that the prior art aerial survey technique described above may give rise to a number of problems and difficulties. First, it may be quite difficult to accurately position the aircraft during the survey using the topographical maps or aerial photographs on which the flight lines have been drawn. This is particularly true in areas of low relief over which the aircraft may need to travel. Positioning may also be a problem over heavily forested, totally denuded, snowcovered, or water-filled areas. Similarly, it may be extremely difficult for the flight line position to later match the photographs taken by the aircraft's camera over such areas with the aerial photograph of the survey area.

In addition, since aeromagnetic surveys are typically flown quite close to the ground, the camera image of the survey area may be quite blurred, with a very small angle of acceptance. Consequently, only a very small visual sample of the ground may be obtained on the film, which in turn also makes flight line recovery very difficult.

An additional difficulty inherent in prior art aeromagnetic techniques arises from the fact that the equipment which the aircraft must carry, together with the required number of crew members, may be quite heavy. Accordingly, a large plane or helicopter is typically required in order to carry all of the equipment and crew members. Unfortunately, however, large planes have a relatively high stall speed. For example, a large fixed wing plane may have a stall speed of over 100 miles per hour. Consequently, when using such a plane, the survey must be flow at over 100 miles per hour in order to avoid stalling. It will be appreciated, however, that flying an aircraft relatively close to the ground at such a speed may be quite dangerous; and it may, therefore, be difficult to find pilots willing to fly the planes in this manner on a regular basis. If, on the other hand, a helicopter is chosen for purpose of conducting a survey, the cost of the survey increases substantially. It is not uncommon at the present time, for example, for helicopters to cost more than $1000 per hour to rent.

In addition to the above, one very significant drawback associated with prior art aeromagnetic survey techniques is that a substantial amount of time is required before a finished survey product is available for use. First, it may take two to three weeks just to complete the task of flight line recovery for the survey. Then, the data must be corrected, plotted, and contoured. Thus, even assuming that all of the instruments on the aircraft were functioning properly during the survey, it may be a month or more before the data acquired during the survey are actually ready for use and analysis. Even more troublesome is the fact that malfunctioning equipment and/or faulty data may not be discovered until weeks after the survey has been flown, and this may require that the survey be reflow at a later date.

Accordingly, it would be an improvement in the art to provide a system and method for conducting geophysical surveys in which the survey pattern may be accurately controlled while collecting data. It would also be an improvement in the art to provide a geophysical survey system in which the area collection equipment is lightweight and the crew requirements are minimal, thereby permitting the use of a small aircraft for aerial survey applications. In addition, it would be an improvement in the art to provide a system and method for conducting geophysical surveys in which the data may be processed and analyzed in real time while the survey is underway. Further, it would be an improvement in the art to provide a system and method for conducting geophysical surveys in which both the integrity of the data and the accuracy of the instruments may be verified before the data acquisition vehicle (DAV) leaves the survey area. Such a system and method are disclosed and claimed herein.

BRIEF SUMMARY AND OBJECTS OF THE INVENTION

The present invention is directed to a system and method for conducting geophysical exploratiton using a real time data collection and processing survey system and signals from a global positioning satellite network. The system comprises a base station, one or more data acquisition vehicles which, in one preferred embodiment, may comprise ultralight aircraft having a low stall speed, and a global positioning satellite network. The base station is provided with a computer, radio communication equipment, and means for determining from signals of the satellite network the position of the base station. The data acquisition vehicles are each provided with suitable survey data collection instrumentation, radio communication equipment, an acquisition vehicle positioning display, and means using signals of the satellite network to calculate at least an approximate horizontal position of the data acquisition vehicle.

During a survey, by periodically polling each data acquisition vehicle, the base station positioning system determines the location of each vehicle and accurately tracks its position, both with respect to the base station, and with respect to a preselected survey pattern over the geographic area to be surveyed. The base station also transmits signals to the data acquisition vehicle positioning display aboard each data acquisition vehicle so as to automatically guide the pilot or driver of each with a very high degree of precision along the preselected survey pattern. As the survey progresses, data representing measurements made by the data collection instrumention of each data acquisition vehicle are periodically digitized and transmitted to the base station computer. The data are checked, interpreted, and correlated with the position of the data acquisition vehicle by the base station computer in real time. Thus, as the data are collected, it is analyzed and compiled in a useable format for on-site evaluation.

It is, therefore, a primary object of the present invention to provide a real time geogphysical survey system for data collection and processing, and which is capable of yielding on-site high quality data and data processing at a relatively low cost.

It is also an object of the present invention to provide a survey system in which the survey instrumentation is lightweight and may thus be carried by a light airborne unit such as an ultralight aircraft.

It is a further object of the present invention to provide a data collection and data processing system which permits an on-site check of the integrity of the collected data and of the accuracy of the data collection instruments.

It is a still further object of the present invention to provide a geophysical data collection and data processing system in which the data is evaluated in real time as the survey progresses.

It is additionally an object of the present invention to provide such a survey system in which at least some of the parameters of position for various of the components of the system are determined using signals from a global satellite positioning network.

These and other objects and features of the present invention will become more fully apparent from the following description and appended claims, taken in conjunction with the accompanying drawings.

BRIEF DESCRIPTION OF THE DRAWINGS

In order that the manner in which the above-recited and other advantages and objects of the invention are obtained, a more particular description of the invention briefly described above will be rendered by reference to the specific embodiments thereof which are illustrated in the appended drawings. Understanding that these drawings depict only typical embodiments of the invention and are therefore not to be considered limiting of its scope, the invention will be described with additional specificity and detail through the use of the following drawings in which.

DETAILED DESCRIPTION OF THE PREFERRED EMBODIMENT

Figure 2:
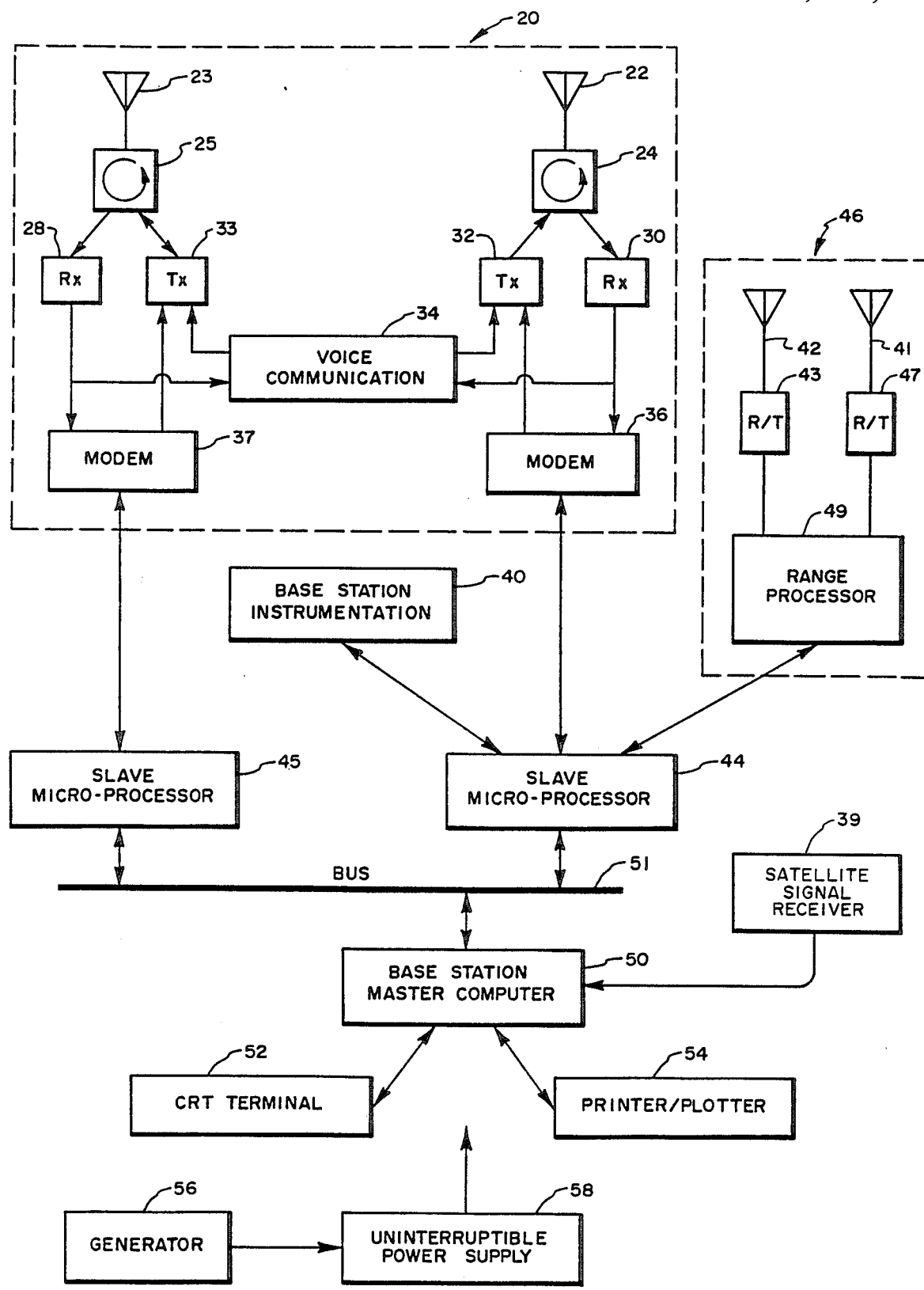
FIG. 2 is a functional block diagram illustrating one presently preferred embodiment of the base station component of the system of the present invention.
Figure 3:
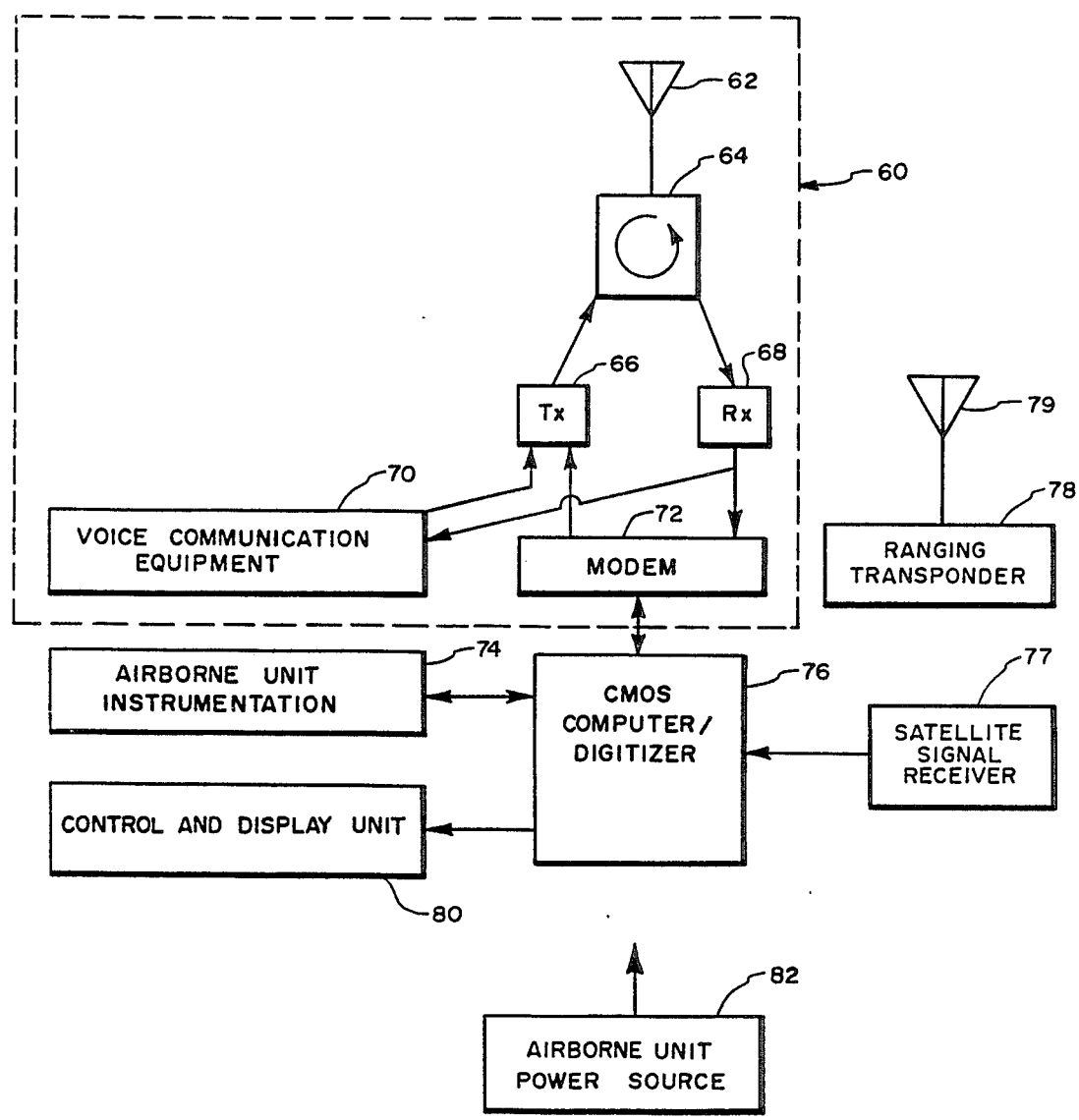
FIG. 3 is a functional block diagram illustrating one presently preferred embodiment of the data collection and communication equipment carried by a data acquisition vehicle component of the system of the present invention.

It will be readily appreciated that the system and method of the present invention as generally described and illustrated in the figures herein could be arranged and designed in a wide variety of different configurations. Thus, the following more detailed description of the presently preferred embodiment of the invention as illustrated in FIGS. 1 through 3 is not intended to limit the scope of the invention but is merely representative of one embodiment of the invention.

Figure 1:
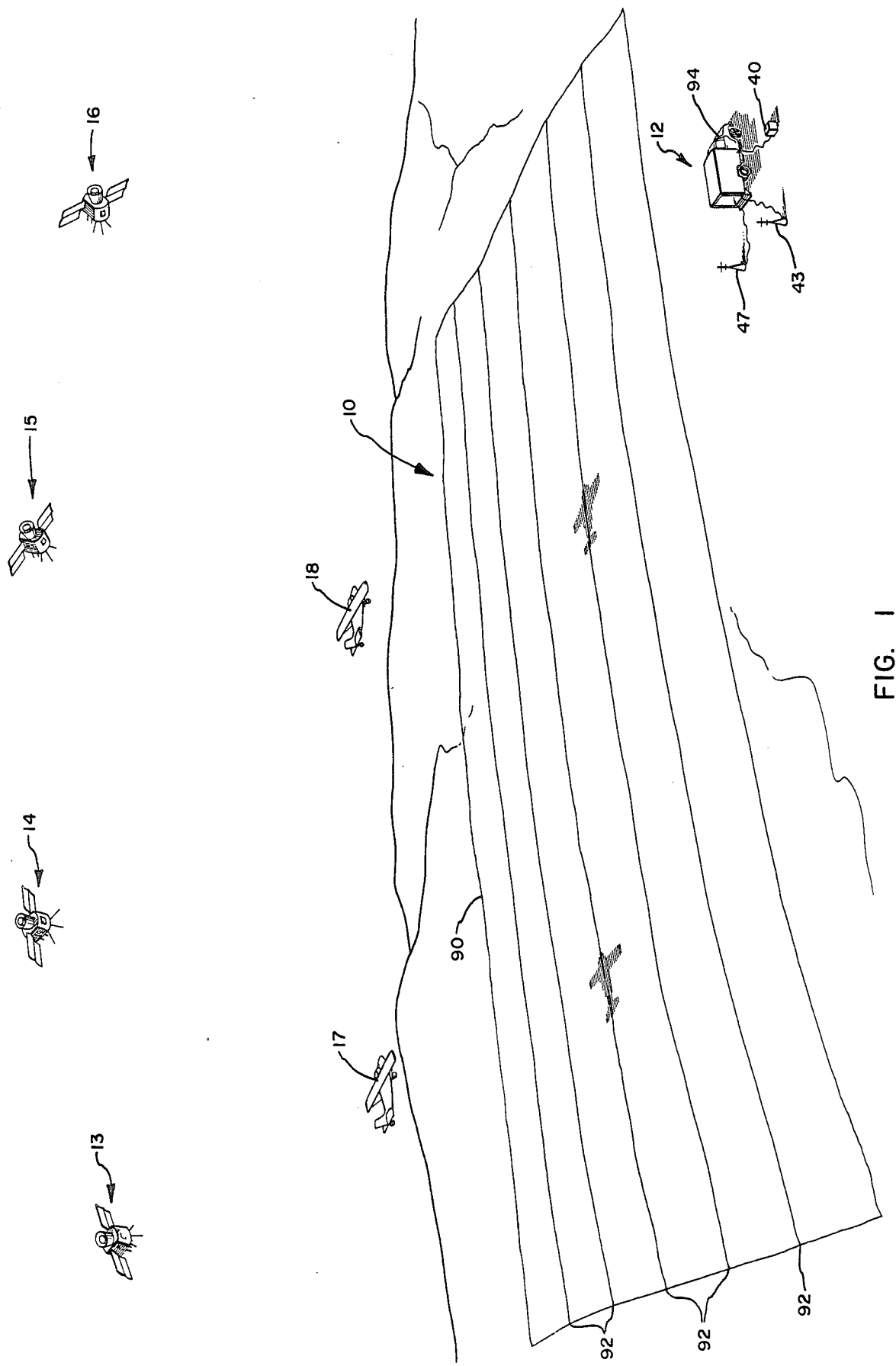
FIG. 1 is a perspective view schematically illustrating one presently preferred embodiment of the real time data collection and processing system of the present invention.

The field set up for the real time aerial survey system is generally designated at 10 in FIG. 1. As shown in the presently preferred embodiment of the invention, the system 10 comprises a base station 12, a plurality of earth-orbiting satellites 13, 14, 15, and 16 forming part of a global positioning satellite network, and data acquisition vehicles which, for an aerial survey system, comprise one or more aircraft, such as airborne units 17 and 18. Advantageously, airborne units 17 and 18 may comprise, for example, ultralight aircraft or another suitable aircraft which has a low stall speed and which can be flown safely at relatively low altitudes and speeds.

Satellites 13, 14, 15, and 16 could be satellites such as those maintained by the United States Department of Defense in the NAV-STAR Global Positioning Satellite Constellation for enabling the precise computing of latitude, longitude, height, and other data relative to stationary or mobile earthbound platforms which are equipped with suitable position determining equipment that use signals of the satellite network to calculate the positional data. Of the eighteen non-geostationary satellites ultimately envisioned in the NAV-STAR Global Positioning Satellite Constellation, six are currently in orbit and available for researach and development purposes. The position of each satellite is determined by Department of Defense ground stations. These positions, continually updated, are broadcast from each satellite respectively for reception by suitable position determining equipment to be described subsequently. The signals from at least three satellites received simultaneously by such position determining equipment is adequate to calculate relatively accurately the latitude and longitude of the receiver. If signals from four satellites are receivable simultaneously, then the height or altitude of the receiver is also determinable.

In the survey system of the present invention, both base station 12 and any data acquisition vehicles, such as airborne units 17 and 18, are provided with position determining equipment compatible with the global positioning satellite network to be employed. The signals of the satellite network are then used to calculate on a continuing basis at least the horizontal position, the latitude and longitude, of base station 12 and each data acquisition vehicle. Generally it is contemplated that base station 12 will remain immobile during a given survey. Accordingly, by repeated computation of its position using signals from the global positioning satellite network, the horizontal position of base station 12 can be determined with a high degree of accuracy. The accuracy of the position of each mobile data acquisition vehicle, however, is limited by the accuracy of the position data transmitted by the satellites of the network, a factor controlled in the instance of the NAV-STAR Global Positioning Satellite Constellation, by the Department of Defense. In that system, a location accuracy within only 25 meters is attainable at a simple receiver using signals from the satellite network. This limited degree of accuracy will be referred to hereafter as system error.

Nevertheless, through a process of communicating the base station and data acquisition vehicle positions to each other in real time, the position of each acquisition vehicle can be calculated to between two and five meters. This method of operation is referred to as real time differential operation using global positioning satellite network signals. In the real time differential method of positioning, the position of each data acquisition vehicle in relation to the base station is periodically refined by removing from the position of the data acquisition vehicle as determined from signals of the satellite network the system error present.

The polling process and the calculation of data acquisition vehicle positions of enhanced accuracy could in theory occur either at base station 12 or on board the data acquisition vehicle involved. Nevertheless, where a data acquisition vehicle in the form of a low-speed ultralight aircraft is desired, these functions are preferably conducted at base station 12 in order to lighten the payload required to be carried by the data aquisition vehicle. It is the structure and operation of such a system that will be described below.

In cooperation with earth-orbiting satellites, such as satellites 13, 14, 15, adn 16, base station 12 periodically polls airborne units 17 and 18 each of the approximate position thereof, as determined thereat from signals of the satellite network. This data is then used by a base station computer to calculate an accurate position for airborne units 17 and 18 with which base station 12 guides airborne units 17 and 18 in accordance with a selected survey pattern represented by flight lines 92 over a survey area 90. During the survey, geophysical data measured by instruments on board the airborne units 17 and 18 are digitized and periodically transmitted back to base station 12, where the data are then correlated in real time with respect to the position of the airborne unit 17 or 18 at the time the data was collected.

The various hardware components which comprise base station 12 are illustrated in FIG. 2. As shown, base station 12 is provided with communication equipment as generally indicated at 20 to permit telemetry and voice communication between base station 12 and airborne units 16 and 18. Communication equipment 20 may, for example, comprise an antenna 22 which is connected to a duplexer 24, duplexer 24 permitting antenna 22 to be used for both reception and transmission. Communication equipment 20 may also include a conventional transmitter 32 and receiver 30 connected to standard voice communication equipment 34, and a modem 36 which is connected as shown. Thus, communication equipment 20 allows base station 12 to receive either digital or voice signals transmitted from one of airborne units 16 or 18 and to transmit either digital or voice signals to airborne units 16 and 18. Geophysical data collected at each data acquisition vehicle, as well as the approximate position of each calculated from signals of the satellite network, are received in this manner.

Since in the preferred embodiment as illustrated in FIG. 1 two airborne units are used, the communication equipment 20 includes a second set of equipment configured like that described above. Thus, antenna 23, duplexer 25, receiver 28, transmitter 33 and modem 37 operate in the same manner already described.

As further illustrated in FIG. 2, modems 36 and 37 of communication equipment 20 are each connected to a slave processor 44 and 45, respectively. As set forth more fully below, a primary function of slave processors 44 and 45 is to handle communication protocol for base station 12. Thus, slave processors 44 and 45 process and transmits data to other components of base station 12 and also help control the transmission and reception of data to airborne units 17 and 18. Where the weight of the data acquisition vehicles is not of necessity being minimized in a survey system according to the present invention, slave micro-processors, such as slave microprocesses 44 and 45 could be located on the data acquisition vehicles to regulate the transmission and reception of data in the system from that point.

Base station 12 also comprises base station instrumentation 40. Instrumentation 40 may be any instrumentation which is suitable for a particular, desired application of the geophysical survey system of the present invention. For example, when geophysical survey system 10 is to be used for aeromagnetic surveying, base station instrumentation 40 may comprise a suitable barometer and a magnetometer. In other types of applications, the instrumentation might comprise, for example, a gas chromatograph, a mass spectrometer, a gamma ray spectrometer, a magnetic gradiometer or other types of instrumentation adapted for gathering specific types of data. Instrumentation 40 is thus used as a norm against which to compare the geophysical data collected by the data collection vehicles of the survey system. In addition, if included as part of the instrumentation 40, an altimeter can serve the additional function of determining the altitude component of the position of base station 12.

In accordance with one aspect of the present invention, base station 12 is provided with a satellite signal reception means for determining from signals of the satellite network at least the horizontal position of base station 12. By way of example and not limitation, a satellite signal receiver 39 receives signals from satellites such as satellites 13, 14, 15, and 16 and computes therefrom the position of base station 12. Where signals from four satellites can reliably be received by satellite signal receiver 39, then the position of base station 12 calculated can include not only latitude and longitude, but the altitude of base station 12. In the alternative, if signals from only three satellites can be received at base station 12, then only the latitude and longitude components of the position of base station 12 can be computed, and the altitude thereof can be determined from a suitable altimeter included in base station instrumentation 40. Satellite signal receiver 39 may be connected directly as by way of a slave processor to the base station master computer 50. Computer 50 periodically checks and verifies or corrects the position of airborne units 17 and 18 in accordance with the selected survey pattern over survey are 90 (see FIG. 1).

In the alternative to using signals of the satellite network to locate base staton 12 and airborne units 17 and 18, or as a back-up measure, base station 12 may be provided with a data acquisition vehicle ranging system generally designated at 46. Ranging system 46 has separate antennae 41–42 which receive positioning signals on different frequencies by way of transmitter/receivers 43 and 47 from each of the airborne units 17 or 18. As described more fully below, ranging system 46 processes the information received using a range processor 49 to determine the distances between each data acquisition vehicle and base station 12. This information is sent through slave processor 44 to base station master computer 50. In such instances as use of ranging system 46 is required, it will be necessary in order to use conventional triangulation techniques in locating airborne units 17 and 18 with accuracy, to employ, in addition to the devices described, one or more reference stations (not shown) fixed in relation to base station 12 in the vicinity of the survey during the duration thereof.

Slave processors 44 and 45 are connected by data bus 51 to base station master computer 50. As hereinafter more fully described, slave processors 44 and 45 transmit data to computer 50 along data bus 51, and computer 50 then processes the data in real time. Additionally, computer 50 is provided with suitable peripheral devices such as, for example, a CRT terminal 52 and a printer/plotter 54. Thus, an operator at base station 12 may use computer 50 to control data acquisition and processing during a survey and to display the processes data in real time so that on-site analysis can be achieved even while the survey is underway.

As also shown in FIG. 2, all of the components of base station 12 are powered by a suitable generator 56 which drives an uninterruptable power supply 58. This ensures that the various components of base station 12 are provided with a stable source of power when base station 12 is in the field.

As depicted in FIG. 1, base station 12 may advantageously be housed in a van 94 or some other suitable vehicle. In such a case, base station instrumentation 40 and antennae 41-42 with transmitter/receivers 43 and 47 could optionally be housed in such a manner so as to be capable of being positioned independently of van 94, as shown. Similarly, generator 56 and uninterruptable power supply 58 could optionally be connected to a separate trailer so as to both minimize noise and maximize available space within van 94.

The data collection and communication equipment of a typical data acquisition vehicle is illustrated in FIG. 3. As shown, airborne units 17 and 18 may each include suitable communication equipment as generally indicated at 60. Similar to communication equipment 20 of base station 12, communication equipment 60 may, for example, comprise an antenna 62, a duplexer 64, a transmitter 66, and a receiver 68, duplexer 64 allowing antenna 62 to be used for both transmission and reception. In addition, communication equipment 60 may include standard voice communication equipment 70 and a model 72. Thus, digital or voice signals may be transmitted and received by communication equipment 60 on airborne units 17 and 18. These could include geophysical data collected on board airborne units 17 and 18, as well as the approximate positions thereof calculated from signals of the satellite network.

Airborne units 17 and 18 further include airborne unit instrumentation 74. Instrumentation 74 may comprise any instrumentation which is suitable to the particular type of data being collected. For example, for aeromagnetic surveys, instrumentation 74 may comprise a magnetometer and an altimeter. Other types of instrumentation would be used, as noted above, when detecting different parameters used to define other types of geophysical data. Airborne unit instrumentation 74 is connected to a CMOS computer/digitizer 76. CMOS computer/digitizer 76 controls the collection of analog data from instrumentation 74, digitizes the collected data, and then transmits the digitized data through modem 72 to base station 12. In addition, if included as a part of airborne unit instrumentation 74, a suitable altimeter can serve the additional function of determining the altitude component of the position of the airborne unit on which it is carried.

Further, according to the present invention, airborne units 17 and 18 are provided with satellite signal reception means for determining from signals of the satellite network at least the approximate horizontal position of data acquisition vehicles, such as airborne units 17 and 18. As shown by way of example and not limitation in FIG. 3, satellite signal receiver 77 uses signals from satellites 13, 14, 15, and 16 to determine on a continuing basis the approximate position of each of airborne units 17 and 18. The output of satellite signal receiver 77 is provided to a CMOS computer/digitizer 76, the function of which will be described subsequently.

Where signals from four satellites of the global positioning satelite network can be received by satellite signal receiver 77, then the position of airborne units 17 and 18 can include altitude. Nevertheless, it is acceptable, and in many instances even preferable and more accurate, to use a suitable altimeter, such as that contained in airborne unit instrumentation 74, to determine the altitude of airborne units 16 and 18. Then satellite signal receiver 77 need only receive signals from three satellites, such as satellites 13, 14, 15 and 16.

Under most circumstances, the horizontal position of airborne units 17 and 18 when calculated by satellite signal receiver 77 is not accurate enough to suffice for the type of precise geophysical surveys envisioned by the disclosed survey system. Accordingly, polling of airborne units 17 and 18 from base station 12 and refining of the position of airborne units 17 and 18 as calculated by satellite signal receiver 77 with the position of base station 12 calculated from satellite signal receiver 39 thereat are used in real time differential operation to determine the position of airborne units 17 and 18 in relation to base station 12 with a higher degree of accuracy.

To determine the altitude of base station 12 or the altitude of airborne units 17 and 18, altimeter data collected at airborne unit instrumentation 74 or base station instrumentation 40, respectively, may be required to completely locate base station 12 or airborne units 17 and 18.

After determining such coordinates, base station 12 then transmits a positioning signal from communication equipment 20 to airborne units 17 and 118. The signal is processed by the CMOS computer/digitizer 76 and output at the positioning display 80. Positioning display 80 may be virtually any display means which is suitable to indicate to the pilot of an airborne unit whether or not such airborne unit is correctly following the selected flight line. For example, positioning display 80 may comprise four lighted arrows indicating that the position of the airborne unit should be adjusted either to the left, to the right, upward, or downward.

As with ranging system 46 at base station 12, each airborne unit 17 and 18 can also be provided with a ranging transponder 78 and an associated antenna 79 for back-up purposes or if signals from a satellite network are unavailable. In response to ranging polling signals periodically transmitted by ranging system 46 at an antenna 41 or 42 of base station 12 (see FIG. 2), ranging transponder 78 transmits a signal to ranging system 46 which is received by one of the antennae 41 or 42. The signals from airborne units 17 and 18 are then processed as described above by range processor 49 so as to determine the distance between each airborne unit and base station 12. The information from range processor 49 is then sent by slave processor 44 to master computer 50 which determines data acquisition vehicle position in a manner already described.

Finally, FIG. 3 illustrates that the various components of airborne units 17 and 18 may be powered by an airborne unit power source 82. Power source 82 may, for example, comprise a suitable battery or a suitable generator driven by the aircraft motor.

As an illustration of the manner in which real time data collection and processing may be implemented using the system and method described herein, the following example is provided. The example is to be considered merely as illustrative of one particular design for the system.

EXAMPLE 1

In one example of the geophysical data collection and processing system of the present invention, the data is used to collect high resolution aeromagnetic data and to process it in real time. In this application the airborne unit instrumentation 74 will be mounted, for example, in an ultralight aircraft such as a B1-RD Ultralight manufactured by the Robertson Aircraft Corporation. Because of the low stall speed of the ultralight aircraft, aerial surveys can be conducted at relatively low altitudes and speeds, thus greatly enhancing resolution without endangering the pilot. Two airborne units may be used simultaneously to speed the data collection process.

The airborne unit instrumentation 74 (see FIG. 3) carried by the aircraft consists of a Setra Systems model 270 barometric pressure transducer calibrated for the range of 700 to 1100 mbar, a modified GEM model GSM-11 magnetometer with a custom interface to the CMOS computer/digitizer 76 which is designed to permit measurements of the magnetic field to 0.1 gamma precision at least once every 0.5 seconds, and a Sperry model RT-100A altimeter with an AT-100 antenna. The CMOS computer/digitzer 76 (see FIG. 3) which is located on board the ultralight aircraft consists of a CIM-802 microprocessor with a 2 megahetz clock, and includes the following equipment: a CIM-100 memory expander; a CIM-201 serial input/output port; a CIM-411 analog-to-digital (A/D) converter; a CIM-421 digital to analog (D/A) output; a CIM-610 voltage regulator; and a CIM-602 card cage, all of which are components manufactured by National Semiconductor Corporation. Satellite signal receiver 77 may be one of the global postioning satellite position determining equipment available from such vendors such as Collins, Texas Instruments, or Magnavox for use with the NAV-STAR satellite system. Preferably, however, for ease of interfacing with the equipment already and hereafter described, mini-ranger global positioning system receivers, such as those sold by Motorola, Inc., under the Eagle trademark will be used.

For purposes of this example, other base station components as illustrated in FIG. 2 are as follows: generator 56 may consist of an Onan model 6.5 NH 6.5 KVA gasoline motor generator, and the uninterrupted power supply 58 may consist of a Triad-Utrad model KU-811 750 VA uninterruptable power supply capable of continuous operation with a backup time of 20 minutes. The base station master computer 50 consists of a Digital Equipment Corporation Micro-PDP-11 rack mount computer with the following options: an LSI 11-23 processor, an MSV11-PK 256 kilobyte random access memory; two RX50 and one RD51 disk systems; two MSV11-PL 512 kilobyte random access memories; a DVL11-ED serial communications port; and a DVL11-JA quadruple serial communications port. The CRT terminal 52 may consist of a Digital Equipment Corporation model VT240 text and graphics terminal, and the printer/plotter may be a Digital Equipment Corporation model LA-100 dot matrix printer with dot addressable graphics capability. Satellite signal receiver 39 at base station 12 can be identical to satellite signal receiver 77 carried on airborne units 17 and 18.

The slave processors 44 and 45 may be Digital Equipment Corporation model KXT11-CA slave processors and the bus 51 may consist of a Digital Equipment Corporation Q-22 bus, which is typically supplied as standard equipment with the above-described base station master computer 50.

The optional back-up positioning system 46 of the base station, as well as the transponder 78 of the data acquisition vehicles, can be provided as part of a total system, as for example the Motorola Corporaton Mini-Ranger Falcon 492 Tracking System. This system includes up to three fixed reference stations and eight separate positioning transponders used on data acquisition vehicles. For purposes of this example, two positioning transponders are used and no reference stations are shown.

The base station instrumentation 40 includes a Setra Systems Model 270 barometric pressure tansducer calibrated for the range of 700 to 1100 mbar and a magnetometer capable of measuring the field at least every 0.5 seconds to 0.1 gamma precision. As noted above, the GEM Model GSM-11 meets this requirement.

The communications equipment represented at 20, and for each aircraft at 60 in FIGS. 2 and 3, respectively, may comprise a Motorola Corporaton full duplex radio telemetry system consisting of two model SP27/SQ1017 radios, one of which is used in the aircraft and the other being used at the base station; a Motorola omni-directional antenna with trnamission line, model TAE6052 used on each aircraft; a Motorola Yagi 7.5 dB antenna, model TDE6630 used at the base station; and two Racal-Vadic modems, model VA 1251G/K, one placed in the aircraft and the other at the base station.

As mentioned above, the real time geophysical data collection and processing system of the present invention may be readily employed to collect and process many types of geophysical data, such as in the case of high resolution aeromagnetic surveys. Use of the system to perform data collection and processing of aeromagnetic data would proceed as follows.

First, the aerial survey is planned. That is, a determination is made as to the geophysical area over which the aerial survey is to be conducted, the altitude at which the data is to be collected, and the desired spacing of the flight lines to provide the needed resolution of the data. Thereafter, data representing the desired flight pattern are stored in master computer 50 of base station 12 for use in guiding airborne units 17 and 18 during the survey. The position of base station 12 relative the survey pattern is determined from signals from the satellite network and, if necessary, the altimeter of base station instrumentation 40.

As the airborne units 17 and 18 follow the flight pattern over survey area 90, each aiborne unit calculates its own approximate horizontal position using signals received from the satellite network. If necessary, the altimeter of instrumentation 74 is used to determine the altitude of airborne units 17 and 18. The geophysical data collected by instrumentation 74 and the positional data related to the location of each airborne unit are digitized by the computer/digitizer 76 on board airborne units 17 and 18. The digitized data are then transmitted to the base station by modem 72 and transmitter 66.

At base station 12, the horizontal and altitude position data transmitted from airborne units 17 and 18 are received at one of the antennae 22 or 23 and receives 30 or 28 and sent by a corresponding modem 36 or 37 and slave processor 44 or 45 to the computer 50. A suitable altimeter at base station intstrumentation 40 also collects data that are transmitted from slave processor 44 to the master computer 50 with ranging data relative to the distance of each data acquisition vehicle from base station 12.

Master computer 50 processes the positioning data so as to determine the X, Y and Z coordinates of the aircraft in relation to the geographic survey area 90. These coordinates are then compared with the selected flight lines previously determined and programmed in the base station master computer 50, so that the computer 50 may determine what adjustment, if any, is needed to bring the airborne units 17 and 18 back into alignement with the desired flight pattern. A signal is then transmitted through slave processor 44, modem 36 and transmitter 32 back to airborne units 17 and 18 to indicate the needed adjustment.

The adjustment information sent to airborne units 17 and 18 is received by the computer/digitizer 76 and then displayed at the positioning display 80 to indicate whether each airborne unit 17 and 18 needs to move to the left, to the right, up or down. In this manner, the position of airborne units 17 and 18 is accurately tracked during the course of the survey and can be adjusted in real time to make sure that the desired flight pattern is accurately transversed.

Since the base station is capable of individually tracking and guiding multiple airborne units, several airborne units may be used during a single survey with each unit flying a portion of the total survey flight lines. In this manner the data collection can be accomplished more quickly.

When the system is used to conduct an aeromagnetic survey as in the case of Example 1 mentioned above, the airborne unit instrumentation 74 carried on board the aircraft also transmit analog magnetic field data to the computer/digitizer 76. This geophysical data is digitized and transmitted through modems 72 and 36 to slave processor 44. Slave processor 44 then transfers the geophysical data to the master computer 50 which processes, stores and then outputs the geophysical data to CRT terminal 52 and/or the printer/plotter 54.

The geophysical data that is collected by the airborne unit instrumentation 74 is synchronized with the positioning data that is sent back to the base station 12 so that the geophysical data can be correlated in real time to the survey coordinates which represent the position of the airborne unit at the time the data was collected. Synchronization is provided by a clock at the master computer 50, which is used to trigger local clocks used in connection with gathering the geophysical and positioning data at synchronized time intervals.

For example, time synchronization between the master clock at base station computer 50 and the local clock used at the computer/digitizer 76 on board each airborne unit may be carried out each time an airborne unit completes a flight line and turns around to begin the next flight line. The process of synchronizing the local time clock used in each computer/digitizer 76 with the master clock in the base station master computer 50 may be accomplished as follows.

A time synchronization data packet is transmitted from the base station at a rising edge of the clock in the master computer 50. Computer/digitizer 76 on board the airborne unit identifies the data packet and notes the current local time. The time to the rising edge of the next clock count of master computer 50 can be calculated, given the baud rate that was used to transmit the synchronization data packet. After the claculated time is passed, the local time clock on board the airborne unit is set to one greater than the time value in the data packet that was transmitted from the base station, and a prescale divide chain is set to zero. The computer/digitizer 76 on board the airborne unit then sends a similar data packet back to the base station and the time value in the data packet transmitted from the airborne unit is compared to the master time clock. If the difference between the local and the master time clocks is within a selected tolerance, synchronization is assured; otherwise the time synchronization process is repeated.

Since the geophysical data and the position data collected by each airborne unit is synchronized, the base station computer 50 is able to correlate the position of the airborne unit at the time the geophysical data was collected, with the coordinates the geographic area 90. In this manner the master computer 50 can determine the position of the airborne unit in relation to area 90 at the time the data was collected. The geophysical data is processed in real time by the base station computer 50 and displayed at the CRT terminal 52 and/or the printer 54 so that an operator at the base station can analyze the data as it is collected. Significantly, the operator at the base station can make dynamic changes in the survey flight pattern or can have segments of the flight pattern reflown, if the data is inadequate to permit accurate interpretation. This significantly enhances the accuracy and reliability of the aerial survey, making the entire process much more efficient and reliable.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A real time survey system utilizing signals from a global positioning satellite network for conducting surveys of a specified geographic area, the system comprising:
   (a) a data acquisition vehicle for traversing the specified geographic area;
   (b) detection means carried by said data acquisition vehicle for measuring one or more parameters which define geophysical data;
   (c) tracking means for automatically computing the vertical and horizontal position of said data acquisition vehicle relative the specified geographic area, said tracking means using signals of the satellite network in calculating at least said horizontal position of said data acquisition vehicle;
   (d) quidance means carried by said data acquisition vehicle and communicating with said tracking means for automatically guiding said data acquisition vehicle along preselected travel paths of a survey pattern relative to the specified geographic area according to the position of said data acquisition vehicle computed by said tracking means; and
   (e) first data processing means communicating with said tracking means and said detection means for correlating in real time said geophysical data with said position of said data acquisition vehicle in relation to said specific geographic area at each instant of time when said parameters were detected.

2. A real time survey sysatem as recited in claim 1, wherein said tracking means comprises:
   (a) a base station;
   (b) first stellite signal reception means located on said data acquisition vehicle for determining from signals of the satellite network the position of said data acquisition vehicle;

(c) second satellite signal reception means located at said base station for determining from signals of the satellite network the position of said base station; and (d) data processing means for calculating the position of said data acquisition vehicle in relation to the specified geographic area from data collected from said first and second satellite signal reception means.

3. A real time survey system as recited in claim 1, wherein said tracking means comprises:
(a) a base station;
(b) a first altimeter located at said data acquisition vehicle;
(c) first satellite signal reception means located on said data acquisition vehicle for determining from signals of the satellite network the horizontal position of said data acquisition vehicle;
(d) second satellite signal reception means located at said base station for determining from signals of the satellite network the position of said base station; and
(e) data processing means for calculating the position of said data acquisition vehicle in relation to the specified geographic area from data collected from said first altimeter and said first and second satellite signal reception means.

4. A real time survey system as recited in claim 1, wherein said tracking means comprises:
(a) a base station;
(b) a second altimeter located at said base station;
(c) first satellite signal reception means located on said data acquisition vehicle for determining from signals of the satellite network the position of said data acquisition vehicle;
(d) second satellite signal reception means located at said base station for determining from signals of the satellite network the horizontal position of said base station; and
(e) second data processing means for calculating the position of said data acquisition vehicle in relation to the specified geographic area from data collected from said second altimeter and said first and second satellite signal reception means.

5. A real time survey system as recited in claim 1, wherein said tracking means comprises:
(a) a base station;
(b) first and second altimeters located at said data acquisition vehicle and at said base station, respectively;
(c) first satellite signal reception means located on said data acquisition vehicle for determining from signals of the satellite network the horizontal position of said data acquisition vehicle;
(d) second satellite signal reception means located at said base station for determining from signals of the satellite network the horizontal position of said base station; and
(e) second data processing means for calculating the position of said data acquisition vehicle in relation to the specified geographic area from data collected from said first and second altimeters and said first and second satellite signal reception means.

6. A real time survey system as recited in claim 5, wherein said second data processing means is located at said base station.

7. A real time survey system as recited in claim 5, wherein said detection means comprises:

(a) instrumentation for generating analog signals representing said parameters defining said geophysical data; and
(b) digitizing means for converting said analog signals into digitized signals for inputting to said first data processing means.

8. A real time survey system as recited in claim 1, wherein said data acquisition vehicle comprises an aircraft.

9. A real time survey system as recited in claim 8, wherein said aircraft is an ultralight aircraft.

10. A real time aerial survey system for conducting surveys over a specified geographic area, the system comprising:
(a) a global positioning satellite network;
(b) an aircraft;
(c) detection means on said aircraft for measuring one or more parameters which define geophysical data;
(d) tracking means for automatically computing the altitude of said aircraft and the horizontal position thereof relative the specified geographic area, said tracking means using signals of said satellite network in calculating said horizontal position of said aircraft;
(e) guidance means carried by said aircraft and communicating with said tracking means for automatically guiding said aircraft along preselected travel paths of a survey pattern over the specified geographic area according to the altitude and horizontal position of said data acquisition vehicle computed by said tracking means; and
(f) first data processing means communicating with said tracking means and said detection means for correlating in real time said geophysical data with said position of said aircraft in relation to said specific geographic area at each instant of time when said parameters were detected.

11. A real time aerial survey system as recited in claim 10, wherein said tracking means comprises:
(a) a base station;
(b) first and second altimeters located at said aircraft and at said base station, respectively;
(c) first satellite signal reception means located at said base station for determining from signals of the satellite network the horizontal position of said base station to a first degree of accuracy;
(d) second satellite signal reception means located on said aircraft for determining from signals of the satellite network the horizontal position of said aircraft to a second degree of accuracy less than said first degree of accuracy; and
(e) second data processing means for calculating the position of said aircraft relative the specified geographic area to a third degree of accuracy intermediate said first and second degrees of accuracy by using data collected from said first and second barometric altimeters and said first and second satellite signal reception means.

12. A real time aerial survey system as recited in claim 11, wherein said first data processing means is located at said base station.

13. A real time aerial survey system as recited in claim 11, wherein said second data processing means is located at said base station.

14. A real time aerial survey system as recited in claim 11, wherein said first and said second data processing means are located at said base station.

15. A real time aerial survey system as recited in claim 14, further comprising communication means for transmitting data between said aircraft and said base station.

16. A real time aerial survey system as recited in claim 10, wherein said aircraft is an ultralight aircraft.

17. A real time aerial survey system as recited in claim 10, wherein said base station remains immobile during the conducting of a survey over the specified geographic area.

18. An aerial survey system for collecting geophysical data in a specified geographic area and for processing said geophysical data in real time, said survey system comprising:
   (a) a global positioning satellite network;
   (b) a data acquisition aircraft for traversing the specified geographic area, the data acquisition aircraft comprising:
      (i) detection means for measuring one or more parameters which define the geophysical data;
      (ii) a first alimeter for determining the altitude of said aircraft;
      (iii) a first satellite signal reception means for determining from signals of the satellite network the approximate horizontal position of said data acquisition aicraft;
      (iv) aircraft communication means for transmitting in synchronization signals representing said altitude and said approximate horizontal position of said aircraft and signals representing said parameters; and
      (v) guidance means for receiving signals representing the automatically computed real time position of said aircraft, such that the course of said aircraft can be corrected to maintain said aircraft in alignment with preselected travel paths of a survey pattern over the specified geographic area; and
   (c) a base section comprising:
      (i) a second altimeter for determining the altitude of said base station;
      (ii) a second satellite signal reception means for determining from signals of the satellite network the horizontal position of said base station;
      (iii) telemetry means for receiving from said aircraft said signals transmitted by said aircraft communication means;
      (iv) data processing means connected to said second altimeter and said telemetry means for electronically processing signals therefrom to determine automatically the real time position of said data acquisition vehicle in relation to said geographic area and to correlate and display automatically in real time said geophysical data and said position of said aircraft in relation to where in the specified geographic region said geophysical data was measured; and
      (v) base station transmission means for broadcasting signals representing said real time position of said aircraft automatically computed by said data processing means to said guidance means of said aircraft.

19. An aerial survey system as recited in claim 18, wherein said aircraft is an ultralight aircraft.

20. An aerial survey system as recited in claim 19, wherein said aircraft transmitting means comprises:

(a) digitizing means for converting data to be broadcast by said aircraft transmitting means into digitized signals;
   (b) a modem connected to said digitizing means for receiving said digitized signals;
   (c) an electronic transmitter connected to said modem; and
   (d) an antenna connected to said transmitter, said electronic transmitter and said antenna together transmitting said digitized signals.

21. An aerial survey system as recited in claim 19, wherein said guidance means comprises:
   (a) a duplexer interconnected between said transmitter and said antenna of said aircraft transmitting means for permitting said antenna to be used both for transmitting and for receiving electronic signals;
   (b) a receiver interconnected between said duplexer and said modem; and
   (c) display means communicating with said receiver for depicting the relationship between said real time position of said aircraft relative said geographic area and said preselected travel paths of a survey pattern thereover.

22. An aerial survey system as recited in claim 18, wherein said detection means comprises a magnetometer.

23. An aerial survey system as recited in claim 18, wherein said telemetry means comprises:
   (a) an electronic receiver;
   (b) a first antenna connected to said electronic receiver, said first antenna and said receiver being adapted to receive digitized signals transmitted from said aircraft; and
   (c) a modem connected to said electronic receiver communicating with said data processing means.

24. An aerial survey system as recited in claim 18, wherein said data processing means comprises:
   (a) a data transfer bus;
   (b) a slave processor connected to said data transfer bus for controlling the transfer of data to said data transfer bus;
   (c) a master computer connected to said data transfer bus, said master computer being adapted to process said signals received from said aircraft transmission means by said telemetry means in real time so as to correlate said geophysical data to each position on said specific geographic area where said data was detected; and
   (d) means for displaying said geophysical data processed by said master computer.

25. In a survey system having a data acquisition vehicle and a base station, a method of collecting geophysical data over a specified geographic area and of processing said data in real time, said method comprising the steps of:
   (a) automatically determining the horizontal and vertical position of said base station utilizing signals from a global positioning satellite network to determine at least said horizontal position thereof;
   (b) automatically determining the vertical position of said data acquisition vehicle and from signals from a global positioning satellite network the approximate horizontal position of said data acquisition vehicle;
   (c) detecting one or more parameters which define said geophysical data as said data acquisition vehicle trasverses a selected survey pattern over said specified geographic area;

(d) synchronizing the detection of said parameters with the determining of the vertical and horizontal position of said data acquisition vehicle;

(e) transmitting electronic signals representing said geophysical data and said vertical and horizontal position of said data acquisition vehicle from said data acquisition vehicle to said base station;

(f) receiving at said base station said signals transmitted from said data acquisition vehicle;

(g) electronically processing said signals representing said vertical and horizontal position of said data acquisition vehicle received at said base station so as to determine automatically in real time the real time position of said data acquisition vehicle in relation to said geographic area and to said selected survey pattern;

(h) automatically guiding said data acquisition vehicle along said preselected survey pattern according to electronic signals received from said base station representing the rear time position of said data acquisition vehicle; and (i) electronically processing said signals representing said geophysical data received at said base station to correlate and display automatically in real time said geophysical data at each position of said data acquisition vehicle corresponding to the position on said geographic area at which said geophysical data was detected.

* * * * *